(12) United States Patent
Suyama

(10) Patent No.: US 11,522,170 B2
(45) Date of Patent: Dec. 6, 2022

(54) AQUEOUS BATTERY

(71) Applicant: TOYOTA JIDOSHA KABUSHIKI KAISHA, Toyota (JP)

(72) Inventor: Hiroshi Suyama, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/099,902

(22) Filed: Nov. 17, 2020

(65) Prior Publication Data

US 2021/0159482 A1    May 27, 2021

(30) Foreign Application Priority Data

Nov. 25, 2019  (JP) .............................. JP2019-212340

(51) Int. Cl.
    *H01M 4/131*      (2010.01)
    *H01M 10/058*     (2010.01)
    *H01M 10/0567*    (2010.01)

(52) U.S. Cl.
    CPC ......... *H01M 4/131* (2013.01); *H01M 10/058* (2013.01); *H01M 10/0567* (2013.01)

(58) Field of Classification Search
    CPC ................ H01M 4/583; H01M 10/0566–0569
    See application file for complete search history.

(56) References Cited

U.S. PATENT DOCUMENTS

| 2013/0130113 | A1* | 5/2013 | Takano | H01M 4/525 |
|---|---|---|---|---|
| | | | | 429/223 |
| 2015/0303489 | A1* | 10/2015 | Wang | H01M 4/48 |
| | | | | 429/90 |
| 2019/0036173 | A1 | 1/2019 | Tojigamori et al. | |

FOREIGN PATENT DOCUMENTS

JP           2019-029077 A       2/2019

OTHER PUBLICATIONS

Marsh, Harry, and Rodriguez-Reinoso F. "Chapter 9—Production and Reference Material." Activated Carbon, Elsevier, Amsterdam, 2006, pp. 454-508 (Year: 2006).*

* cited by examiner

*Primary Examiner* — Stephan J Essex
(74) *Attorney, Agent, or Firm* — Oliff PLC

(57) ABSTRACT

Provided is an aqueous battery configured to use hydroxide ions ($OH^-$) as carrier ions. The aqueous battery is an aqueous battery comprising a cathode layer, an anode layer and an aqueous liquid electrolyte, wherein the cathode layer contains, as a cathode active material, a graphite having a rhombohedral crystal structure; wherein the anode layer contains, as an anode active material, at least one selected from the group consisting of an elemental Zn, an elemental Cd, an elemental Fe, a Zn alloy, a Cd alloy, an Fe alloy, ZnO, $Cd(OH)_2$, $Fe(OH)_2$ and a hydrogen storage alloy; and wherein, as an electrolyte, at least one selected from the group consisting of KOH and NaOH is dissolved in the aqueous liquid electrolyte.

7 Claims, 6 Drawing Sheets

AQUEOUS BATTERY

TECHNICAL FIELD

The disclosure relates to an aqueous battery.

BACKGROUND

In recent years, with the rapid spread of IT and communication devices such as personal computers, camcorders and cellular phones, great importance has been attached to the development of batteries that is usable as the power source of such devices.

Patent Literature 1 discloses a dual-ion secondary battery which uses graphite in the cathode and which uses insertion and extraction reactions of TFSI anions ($N(SO_2CF_3)_2^-$) between the graphite layers.

Patent Literature 1: Japanese Patent Application Laid-Open No. 2019-029077

For reduction of battery production costs, there is a demand for the development of a novel aqueous battery configured to use hydroxide ions ($OH^-$) as carrier ions.

SUMMARY

The disclosed embodiments were achieved in light of the above circumstances. A main object of the disclosed embodiments is to provide an aqueous battery configured to use hydroxide ions ($OH^-$) as carrier ions.

In a first embodiment, there is provided an aqueous battery comprising a cathode layer, an anode layer and an aqueous liquid electrolyte, wherein the cathode layer contains, as a cathode active material, a graphite having a rhombohedral crystal structure;

wherein the anode layer contains, as an anode active material, at least one selected from the group consisting of an elemental Zn, an elemental Cd, an elemental Fe, a Zn alloy, a Cd alloy, an Fe alloy, ZnO, $Cd(OH)_2$, $Fe(OH)_2$ and a hydrogen storage alloy; and wherein, as an electrolyte, at least one selected from the group consisting of KOH and NaOH is dissolved in the aqueous liquid electrolyte.

The volume-based median diameter (D50) of the graphite may be from 7 μm to 30 μm.

The graphite may be a natural graphite or a pyrolytic graphite.

The BET specific surface area of the graphite may be 5.7 $m^2/g$ or more.

The volume-based median diameter (D50) of the graphite may be from 17 μm to 30 μm.

According to the disclosed embodiments, the aqueous battery configured to use hydroxide ions ($OH^-$) as carrier ions, is provided.

BRIEF DESCRIPTION OF THE DRAWINGS

In the accompanying drawings.

DETAILED DESCRIPTION

According to the disclosed embodiments, an aqueous battery comprising a cathode layer, an anode layer and an aqueous liquid electrolyte is provided, wherein the cathode layer contains, as a cathode active material, a graphite having a rhombohedral crystal structure;

wherein the anode layer contains, as an anode active material, at least one selected from the group consisting of an elemental Zn, an elemental Cd, an elemental Fe, a Zn alloy, a Cd alloy, an Fe alloy, ZnO, $Cd(OH)_2$, $Fe(OH)_2$ and a hydrogen storage alloy; and wherein, as an electrolyte, at least one selected from the group consisting of KOH and NaOH is dissolved in the aqueous liquid electrolyte.

A hermetically-closed aqueous battery using a zinc-based material as the anode active material, generally uses $Ni(OH)_2$ as the cathode active material. However, Ni is a costly raw material and is not abundant. Since battery applications require high-purity Ni, there is possibility that the supply of Ni decreases in the future and Ni resources are depleted.

The aqueous battery in which, as an alternative to Ni, graphite is used as the cathode active material, will be discussed. For the aqueous battery, it was unclear about the type of graphite which exhibits, among various types of graphites, the best reaction activity to the extraction and insertion reactions of desired anions. Accordingly, an aqueous battery using highly oriented pyrolytic graphite (HOPG) that is ideal from the viewpoint of shape and appearance, is used in research. However, the aqueous battery using HOPG is not practical since HOPG is very expensive.

For the aqueous battery using the extraction and insertion reactions of hydroxide ions, it was found that the graphite having the rhombohedral crystal structure, which is contained as the cathode active material, exhibits reaction activity to the hydroxide ion extraction and insertion reactions. It was also found that the charge-discharge efficiency of the aqueous battery is increased by the use of the graphite having a predetermined average particle diameter.

Since the aqueous battery of the disclosed embodiments uses the graphite, which is an abundant resource, the production cost can be reduced compared to conventional aqueous batteries.

Figure 1:
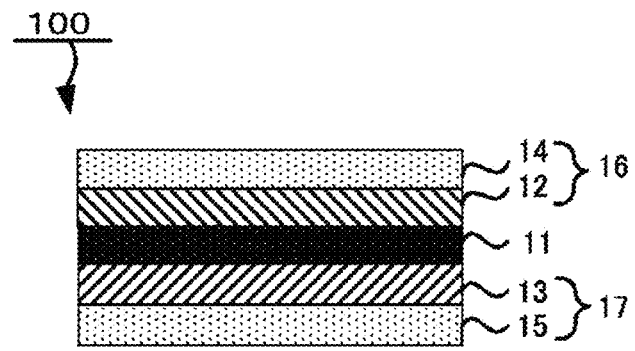
FIG. 1 is a schematic sectional view of an example of the aqueous battery of the disclosed embodiments.

FIG. 1 is a schematic sectional view of an example of the aqueous battery of the disclosed embodiments. An aqueous battery 100, which is an example of the aqueous battery of the disclosed embodiments, comprises: a cathode 16 comprising a cathode layer 12 and a cathode current collector 14, an anode 17 comprising an anode layer 13 and an anode current collector 15, and an aqueous liquid electrolyte 11 disposed between the cathode 16 and the anode 17.

As shown in FIG. 1, the anode 17 is present on one surface of the aqueous liquid electrolyte 11, and the cathode 16 is present on the other surface of the aqueous liquid electrolyte 11. In the aqueous battery, the cathode 16 and the anode 17 are in contact with the aqueous liquid electrolyte 11 for use. The aqueous battery of the disclosed embodiments is not limited to this example. For example, a separator may be disposed between the anode layer 13 and cathode layer 12 of the aqueous battery 100 of the disclosed embodiments. The separator, the anode layer 13 and the cathode layer 12 may be impregnated with the aqueous liquid electrolyte 11. The aqueous liquid electrolyte 11 may impregnate the inside of the anode layer 13 and the cathode layer 12, and the aqueous liquid electrolyte 11 may be in contact with the anode current collector 15 and the cathode current collector 14.

(1) Cathode

The cathode comprises at least the cathode layer. As needed, it further comprises the cathode current collector.

The cathode layer contains at least the cathode active material. As needed, it may contain a conductive additive, a binder, etc.

As the cathode active material, the graphite having the rhombohedral crystal structure may be used.

The graphite can be confirmed to have the rhombohedral crystal structure, when X-ray diffraction measurement of the graphite is carried out to obtain a spectrum, and the spectrum shows that the graphite has peaks at diffraction angles $2\theta$ of $26°\pm0.5°$, $44°\pm0.5°$, $46°\pm0.5°$, $55°\pm0.5°$, $57°\pm0.5°$, $64°\pm0.5°$, $78°\pm0.5°$.

The type of the graphite is not particularly limited, as long as it has the rhombohedral crystal structure. As the graphite, examples include, but are not limited to, a natural graphite, a pyrolytic graphite and an artificial graphite. The graphite may be at least one of a natural graphite and a pyrolytic graphite, or it may be a natural graphite.

The form of the graphite may be a particulate form. In this case, the particulate form is not particularly limited, and it may be a spherical particulate form, a flaky form, or the like.

The BET specific surface area of the graphite is not particularly limited. When the form of the graphite is the spherical form, from the viewpoint of suppressing an oxygen evolution reaction arising from the oxidative decomposition of water, which is a side reaction in the cathode, and from the viewpoint of increasing the charge-discharge efficiency of the aqueous battery, the lower limit of the BET specific surface area may be 3.9 $m^2/g$ or more, or it may be 5.7 $m^2/g$ or more. The upper limit is not particularly limited and may be 9.6 $m^2/g$ or less.

The volume-based median diameter (D50) of the graphite is not particularly limited and may be 1 nm or more and 100 μm or less. The lower limit of the median diameter may be 7 μm or more, and the upper limit may be 30 μm or less.

When the form of the graphite is the spherical form, the volume-based median diameter (D50) of the graphite may be from 7 μm to 21 μm. From the viewpoint of increasing the charge-discharge efficiency of the aqueous battery, it may be from 7 μm to 14 μm.

When the form of the graphite is the flaky form, from the viewpoint of increasing the charge-discharge efficiency of the aqueous battery, the volume-based median diameter (D50) of the graphite may be from 17 μm to 30 μm.

In the disclosed embodiments, unless otherwise noted, the average particle diameter of particles is a volume-based median diameter (D50) measured by laser diffraction/scattering particle size distribution measurement. Also in the disclosed embodiments, the median diameter (D50) of particles is a diameter at which, when particles are arranged in ascending order of their particle diameter, the accumulated volume of the particles is half (50%) the total volume of the particles (volume average diameter).

The cathode active material may contain a cathode active material other than the graphite, to the extent that can achieve the above-mentioned object. However, from the viewpoint of more efficient hydroxide ion insertion and extraction in the aqueous battery, the cathode active material may be composed of the graphite.

The amount of the cathode active material contained in the cathode layer is not particularly limited. For example, when the whole cathode layer is determined as a reference (100 mass %), the cathode active material may be 10 mass % or more. The upper limit of the amount is not particularly limited and may be 100 mass % or less. When the content of the cathode active material is in such a range, the cathode layer can obtain excellent ion conductivity and electron conductivity.

As the conductive additive, a known material may be used. As the conductive additive, examples include, but are not limited to, a carbonaceous material. The carbonaceous material may be at least one selected from the group consisting of carbon black such as Acetylene Black and furnace black, vapor-grown carbon fiber (VGCF), carbon nanotube and carbon nanofiber.

Also, a metal material that is able to withstand battery usage environments, may be used. As the metal material, examples include, but are not limited to, Ni, Cu, Fe and SUS.

The conductive additive may be one kind of conductive additive or may be a combination of two or more kinds of conductive additives.

The form of the conductive additive may be selected from various kinds of forms such as a powdery form and a fiber form.

The amount of the conductive additive contained in the cathode layer is not particularly limited. In the aqueous battery of the disclosed embodiments, as described above, since the graphite with excellent electroconductivity is used as the cathode active material, excellent electron conductivity can be achieved without a further increase in the amount of the conductive additive.

The binder can be selected from binders that are generally used in aqueous batteries. As the binder, examples include, but are not limited to, styrene-butadiene rubber (SBR), carboxymethyl cellulose (CMC), acrylonitrile-butadiene rubber (ABR), butadiene rubber (BR), polyvinylidene fluoride (PVDF) and polytetrafluoroethylene (PTFE).

The binder may be one kind of binder or may be a combination of two or more kinds of binders.

The amount of the binder contained in the cathode layer is not particularly limited. For example, when the whole cathode layer is determined as a reference (100 mass %), the lower limit of the binder amount may be 0.1 mass % or more. The upper limit of the binder amount is not particularly limited and may be 50 mass % or less. When the content of the binder is in such a range, the cathode layer can obtain excellent ion conductivity and electron conductivity.

The thickness of the cathode layer is not particularly limited. For example, it may be 0.1 µm or more and 1 mm or less.

The cathode current collector functions to collect current from the cathode layer. As the material for the cathode current collector, examples include, but are not limited to, a metal material containing at least one element selected from the group consisting of Ni, Al, Au, Pt, Fe, Ti, Co and Cr. As long as the surface of the cathode current collector is composed of the material, the inside of the cathode current collector may be composed of a material that is different from the surface.

The form of the cathode current collector may be selected from various kinds of forms such as a foil form, a plate form, a mesh form and a perforated metal form.

The cathode may further comprise a cathode lead connected to the cathode current collector.

(2) Anode

The anode comprises the anode layer and the anode current collector for collection of current from the anode layer.

The anode layer contains at least an anode active material. As needed, it contains a conductive additive and a binder.

The aqueous battery of the disclosed embodiments uses the oxidation-reduction reaction of the anode active material to charge and discharge.

As the anode active material, examples include, but are not limited to, an elemental Zn, an elemental Cd, an elemental Fe, a Zn alloy, a Cd alloy, an Fe alloy, ZnO, $Cd(OH)_2$, $Fe(OH)_2$ and a hydrogen storage alloy. When the aqueous battery is charged and discharged, these materials can develop an oxidation-reduction reaction with the aqueous liquid electrolyte containing at least one electrolyte selected from the group consisting of KOH and NaOH. Accordingly, the aqueous battery comprising the graphite having the rhombohedral crystal structure as the cathode active material, these materials as the anode active material, and the aqueous liquid electrolyte containing at least one electrolyte selected from the group consisting of KOH and NaOH, is thought to function as a battery. From the viewpoint of increasing the charge-discharge efficiency of the aqueous battery, the anode active material may be an elemental Zn, a Zn alloy and ZnO, for example.

When ZnO is used as the anode active material, from the viewpoint of obtaining excellent electron conductivity and suppressing an oxygen evolution reaction arising from the oxidative decomposition of water when the aqueous battery is over-discharged, at least one of an elemental Zn and a Zn alloy may be further used as the anode active material, and they may be mixed to obtain a mixture of the ZnO and the at least one of an elemental Zn and a Zn alloy as the anode active material. The content of the ZnO in the mixture is not particularly limited, and it may be 50 mass % or more and 99 mass % or less. Also, an elemental Zn that the surface is coated with a ZnO oxide layer, may be used as the anode active material. The Zn alloy is not particularly limited, as long as it contains a Zn element of 50 atomic % or more.

When $Cd(OH)_2$ is used as the anode active material, from the viewpoint of obtaining excellent electron conductivity and suppressing an oxygen evolution reaction arising from the oxidative decomposition of water when the aqueous battery is over-discharged, at least one of an elemental Cd and a Cd alloy may be further used as the anode active material, and they may be mixed to obtain a mixture of the $Cd(OH)_2$ and the at least one of an elemental Cd and a Cd alloy as the anode active material. The content of the $Cd(OH)_2$ in the mixture is not particularly limited, and it may be 50 mass % or more and 99 mass % or less. The Cd alloy is not particularly limited, as long as it contains a Cd element of 50 atomic % or more.

When $Fe(OH)_2$ is used as the anode active material, from the viewpoint of obtaining electron conductivity and suppressing an oxygen evolution reaction arising from the oxidative decomposition of water when the aqueous battery is over-discharged, at least one of an elemental Fe and an Fe alloy may be further used as the anode active material, and they may be mixed to obtain a mixture of the $Fe(OH)_2$ and the at least one of an elemental Fe and an Fe alloy as the anode active material. The content of the $Fe(OH)_2$ in the mixture is not particularly limited, and it may be 50 mass % or more and 99 mass % or less. The Fe alloy is not particularly limited, as long as it contains an Fe element of 50 atomic % or more.

The hydrogen storage alloy may be an AB type alloy (such as TiFe), an $AB_2$ type alloy (such as $ZrV_2$ and $ZrNi_2$), an $A_2B$ type alloy (such as $Mg_2Ni$ and $Mg_2Cu$), an $AB_5$ type alloy (such as $LaNi_5$ and $MmNi_5$), an $A_2B_7$ type alloy (such as $La_2Ni_7$ and $RE_{0.9}Mg_{0.1}Ni_{3.5}$), a body-centered cubic (BCC) lattice structure alloy (such as TiCrV) or the like. "Mm" indicates mischmetal (a mixture of rare-earth elements that contain Ce and La as main components). "RE" indicates a rare-earth element. For example, "RE" is La, Ce, Pr, Nd or the like. As the hydrogen storage alloy, one kind of hydrogen storage alloy may be used solely, or a combination of two or more kinds of hydrogen storage alloys may be used.

The form of the anode active material is not particularly limited. As the form, examples include, but are not limited to, a particulate form and a plate form. When the anode active material is in a particulate form, the average particle diameter may be 1 nm or more and 100 µm or less. When the average particle diameter of the anode active material is in such a range, the anode layer can obtain excellent ion conductivity and electron conductivity.

The amount of the anode active material contained in the anode layer is not particularly limited. For example, when the whole anode layer is determined as a reference (100 mass %), the anode active material may be 10 mass % or more. The upper limit of the amount is not particularly limited and may be 99 mass % or less. When the content of the anode active material is in such a range, the anode layer can obtain excellent ion conductivity and electron conductivity.

The types of the conductive additive and binder contained in the anode layer are not particularly limited. For example, they can be appropriately selected from those exemplified above as the conductive additive and binder contained in the cathode layer.

The amount of the conductive additive contained in the anode layer is not particularly limited. For example, when the whole anode layer is determined as a reference (100 mass %), the conductive additive may be 1 mass % or more. The upper limit of the amount is not particularly limited and may be 90 mass % or less. When the content of the conductive additive is in such a range, the anode layer can obtain excellent ion conductivity and electron conductivity.

The amount of the binder contained in the anode layer is not particularly limited. For example, when the whole anode layer is determined as a reference (100 mass %), the binder may be 1 mass % or more. The upper limit of the amount is not particularly limited and may be 90 mass % or less. When the content of the binder is in such a range, the anode active material and so on can appropriately bind to each other, and the anode layer can obtain excellent ion conductivity and electron conductivity.

The thickness of the anode layer is not particularly limited. For example, it may be 0.1 μm or more and 1 mm or less.

For the aqueous battery of the disclosed embodiments, the material for the anode current collector may be at least one kind of metal material selected from the group consisting of Al, Zn, Sn, Ni, SUS and Cu. As long as the surface of the anode current collector is composed of the metal material, the inside of the anode current collector may be composed of a material that is different from the surface.

As the form of the anode current collector, examples include, but are not limited to, a foil form, a plate form, a mesh form, a perforated metal form and a foam form.

(3) Aqueous Liquid Electrolyte

The solvent of the aqueous liquid electrolyte contains water as a main component. That is, when the whole amount of the solvent (a liquid component) constituting the aqueous liquid electrolyte is determined as a reference (100 mol %), the water may account for 50 mol % or more, 70 mol % or more, or 90 mol % or more. On the other hand, the upper limit of the proportion of the water in the solvent is not particularly limited.

Although the solvent contains water as the main component, it may contain a solvent other than water. As the solvent other than water, examples include, but are not limited to, one or more selected from the group consisting of ethers, carbonates, nitriles, alcohols, ketones, amines, amides, sulfur compounds and hydrocarbons. When the whole amount of the solvent (the liquid component) constituting the aqueous liquid electrolyte is determined as a reference (100 mol %), the solvent other than water may be 50 mol % or less, may be 30 mol % or less, or may be 10 mol % or less.

The aqueous liquid electrolyte used in the disclosed embodiments contains an electrolyte.

As the electrolyte, examples include, but are not limited to, KOH and NaOH. The electrolyte may be KOH.

The concentration of the electrolyte in the aqueous liquid electrolyte can be appropriately determined depending on the properties of the desired battery, as long as the concentration does not exceed the saturation concentration of the electrolyte with respect to the solvent. This is because, when the electrolyte remains in a solid form in water, the solid electrolyte may interfere with battery reaction.

In general, as the concentration of the electrolyte in the aqueous liquid electrolyte increases, the potential window of the aqueous liquid electrolyte extends. However, since the viscosity of the solution increases, the ion conductivity of the aqueous liquid electrolyte tends to decrease. Accordingly, the concentration is generally determined depending on the properties of the desired battery, considering potential window expanding effects and Li ion conductivity.

For example, in the case of using KOH as the electrolyte, the amount of the KOH contained in the aqueous liquid electrolyte may be 1 mol or more, 4 mol or more, or 6 mol or more per L of the water. The upper limit of the amount is not particularly limited, and it may be the saturation amount.

In addition to the solvent and the electrolyte, the aqueous liquid electrolyte may contain other component. For example, when ZnO is used as the anode active material, from the viewpoint of suppressing the dissolution of the anode active material in the aqueous liquid electrolyte, the aqueous liquid electrolyte may contain ZnO. The concentration of the ZnO is not particularly limited and may be in a saturated state. In the aqueous liquid electrolyte, the ZnO may be present as $Zn(OH)_4^{2-}$.

When $Cd(OH)_2$ is used as the anode active material, from the viewpoint of suppressing the dissolution of the anode active material in the aqueous liquid electrolyte, the aqueous liquid electrolyte may contain $Cd(OH)_2$. The concentration of the $Cd(OH)_2$ is not particularly limited and may be in a saturated state. When $Fe(OH)_2$ is used as the anode active material, from the viewpoint of suppressing the dissolution of the anode active material in the aqueous liquid electrolyte, the aqueous liquid electrolyte may contain $Fe(OH)_2$. The concentration of the $Fe(OH)_2$ is not particularly limited and may be in a saturated state.

To control the pH of the aqueous liquid electrolyte, the aqueous liquid electrolyte may contain lithium hydroxide, for example.

The pH of the aqueous liquid electrolyte is not particularly limited. The pH may be 3 or more, or it may be 6 or more, from the viewpoint of suppressing the reductive decomposition of the water in the aqueous liquid electrolyte. The upper limit of the pH is not particularly limited.

(4) Other Components

In the aqueous battery of the disclosed embodiments, a separator may be disposed between the anode layer and the cathode layer. The separator functions to prevent contact between the cathode and the anode and to form an electrolyte layer by retaining the aqueous liquid electrolyte.

The separator may be a separator that is generally used in aqueous batteries. As the separator, examples include, but are not limited to, cellulose-based nonwoven fabric and resins such as polyethylene (PE), polypropylene (PP), polyester and polyamide.

The thickness of the separator is not particularly limited. For example, a separator having a thickness of 5 μm or more and 1 mm or less can be used.

As needed, the aqueous battery of the disclosed embodiments comprises an outer casing (battery casing) for housing the cathode, the anode and the aqueous liquid electrolyte.

The material for the outer casing is not particularly limited, as long as it is stable in electrolyte. As the material, examples include, but are not limited to, resins such as polypropylene, polyethylene and acrylic resin.

The aqueous battery of the disclosed embodiments may be a battery configured to use hydroxide ions as carrier ions. Cations serving as the counterions of the hydroxide ions, are not particularly limited. The cations may be zinc ions, cadmium ions, iron ions or the like, or they may be the ions of the element contained in the hydrogen storage alloy.

When an elemental Zn, a Zn alloy, ZnO are used as the anode active material, the electromotive force of the aqueous battery is about 2 V. When at least one selected from the group consisting of an elemental Cd, an elemental Fe, a Cd alloy, an Fe alloy, $Cd(OH)_2$, $Fe(OH)_2$ and a hydrogen storage alloy is used as the anode active material, the electromotive force is about 1.3 V.

The aqueous battery may be a primary battery or a secondary battery. The aqueous battery may be the latter, since it can be repeatedly charged and discharged and is useful as a car battery, for example. The term "secondary battery" encompasses the use of the secondary battery as a primary battery (i.e., the case where the secondary battery is charged and discharged only once).

As the form of the aqueous battery, examples include, but are not limited to, a coin form, a laminate form, a cylindrical form and a square form.

Figure 2:
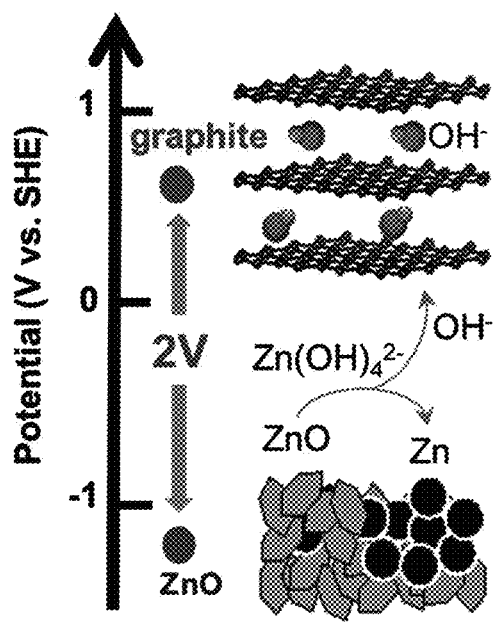
FIG. 2 is a schematic view of the reaction mechanism of a graphite-ZnO aqueous battery.

FIG. 2 shows a schematic view of the reaction mechanism of a graphite-ZnO aqueous battery.

When the aqueous battery of the disclosed embodiments is a graphite-ZnO aqueous battery comprising the graphite having the rhombohedral crystal structure as the cathode active material, a mixture of an elemental Zn and ZnO as the anode active material, and an aqueous liquid electrolyte containing an electrolyte and ZnO as the aqueous liquid electrolyte, the reaction is thought to be as follows.

When the aqueous battery is charged, the ZnO of the anode dissolves in the aqueous liquid electrolyte, turning into $Zn(OH)_4^{2-}$; the $Zn(OH)_4^{2-}$ in the aqueous liquid electrolyte extracts $OH^-$ to precipitate as an elemental Zn in the anode; and the $OH^-$ in the aqueous liquid electrolyte is inserted between the graphite layers of the cathode.

When the aqueous battery is discharged, $OH^-$ is extracted from the graphite layers of the cathode; in the anode, the elemental Zn is coordinated with the $OH^-$ when oxidized and dissolved, turning into $Zn(OH)_4^{2-}$; and the elemental Zn dissolves into the aqueous liquid electrolyte, accordingly. Once the $Zn(OH)_4^{2-}$ exceeds the saturation concentration of the aqueous liquid electrolyte, it extracts $H_2O$ and $OH^-$ to precipitate as ZnO in the anode.

Due to the above reasons, it is thought that the ZnO in the anode can be dissolved in the aqueous liquid electrolyte and precipitated in the anode by charging and discharging the aqueous battery, and the aqueous battery can function as a battery, accordingly. Even when a mixture of a Zn alloy and ZnO is used as the anode active material in place of the mixture of the elemental Zn and the ZnO, the aqueous battery is thought to function as a battery, as well as the case of using the mixture of the elemental Zn and the ZnO.

The aqueous battery of the disclosed embodiments can be produced by employing a known method. For example, it can be produced as follows. However, the method for producing the aqueous battery of the disclosed embodiments is not limited to the following method.

(1) The anode active material for forming the anode layer, etc., are dispersed in a solvent to obtain a slurry for an anode layer. The solvent used here is not particularly limited. As the solvent, examples include, but are not limited to, water and various kinds of organic solvents. The solvent may be N-methylpyrrolidone (NMP). Then, using a doctor blade or the like, the slurry for the anode layer is applied to a surface of the anode current collector. The applied slurry is dried to form the anode layer on the surface of the anode current collector, thereby obtaining the anode.

(2) The cathode active material for forming the cathode layer, etc., are dispersed in a solvent to obtain a slurry for a cathode layer. The solvent used here is not particularly limited. As the solvent, examples include, but are not limited to, water and various kinds of organic solvents. The solvent may be N-methylpyrrolidone (NMP). Using a doctor blade or the like, the slurry for the cathode layer is applied to a surface of the cathode current collector. The applied slurry is dried to form the cathode layer on the surface of the cathode current collector, thereby obtaining the cathode.

(3) The separator is sandwiched between the anode and the cathode to obtain a stack of the anode current collector, the anode layer, the separator, the cathode layer and the cathode current collector, which are stacked in this order. As needed, other components such as a terminal are attached to the stack.

(4) The stack is housed in the battery casing, and the battery casing is filled with the aqueous liquid electrolyte. The battery casing containing the stack and the aqueous liquid electrolyte is hermetically closed so that the stack is immersed in the aqueous liquid electrolyte, thereby obtaining the aqueous battery.

EXAMPLES

The following various kinds of graphites were prepared: a spherical natural graphite (A), a flaky natural graphite (B), a flaky pyrolytic graphite (C) and a randomly-formed artificial graphite (D). Also, rectangular hard carbon and carbon nanotube were prepared as other carbonaceous materials.

Example 1

[Production of Evaluation Cell]

A spherical natural graphite (A) powder having a D50 of 7 μm (BET specific surface area 9.6 $m^2/g$) was prepared as a graphite. As a binder, PVDF (#9305 manufactured by Kureha Corporation) was prepared. The graphite and the PVDF were mixed at a mass ratio of 95:5. A mixture thus obtained was formed into a paste, using N-methylpyrrolidone (NMP) (manufactured by Kishida Chemical Co., Ltd.) as a solvent. The paste was applied on a Ti current collecting foil (manufactured by Rikazai Co., Ltd., thickness 15 μm) that the overvoltage of an oxygen evolution reaction (OER) was large, thereby obtaining an electrode. The electrode was used as a working electrode.

A KOH aqueous solution (concentration 6 mol/L) saturated with ZnO was used as an aqueous liquid electrolyte.

A zinc foil (manufactured by Nilaco Corporation, thickness 50 μm) was used as a counter electrode.

A mercury/mercuric oxide (Hg/HgO) electrode (manufactured by International Chemistry Co., Ltd.) was used as a reference electrode.

A three-electrode SB1A cell (manufactured by EC Frontier Co., Ltd.) was used as a battery evaluation batch cell.

The batch cell was combined with the working, counter and reference electrodes. The aqueous liquid electrolyte was injected into the batch cell, thereby producing the evaluation cell of Example 1.

Example 2

The evaluation cell of Example 2 was produced in the same manner as Example 1, except that a spherical natural graphite (A) powder having a D50 of 14 µm (BET specific surface area 5.7 m$^2$/g) was used as the graphite.

Example 3

The evaluation cell of Example 3 was produced in the same manner as Example 1, except that a spherical natural graphite (A) powder having a D50 of 21 µm (BET specific surface area 3.9 m$^2$/g) was used as the graphite.

Example 4

The evaluation cell of Example 4 was produced in the same manner as Example 1, except that a flaky natural graphite (B) powder having a D50 of 17 µm was used as the graphite.

Example 5

The evaluation cell of Example 5 was produced in the same manner as Example 1, except that a flaky pyrolytic graphite (C) powder having a D50 of 30 µm was used as the graphite.

Comparative Example 1

The evaluation cell of Comparative Example 1 was produced in the same manner as Example 1, except that a randomly-formed artificial graphite (D) powder having a D50 of 5 µm (BET specific surface area 2.9 m$^2$/g) was used as the graphite.

Comparative Example 2

The evaluation cell of Comparative Example 2 was produced in the same manner as Example 1, except that a rectangular hard carbon powder was used in place of the graphite.

Comparative Example 3

The evaluation cell of Comparative Example 3 was produced in the same manner as Example 1, except that carbon nanotube was used in place of the graphite.

[Evaluation of the Evaluation Cells using the Electrodes to which the Various Kinds of the Graphites were Applied]

Using a potentiostat ("VMP3" manufactured by Bio-Logic), cyclic voltammetry (CV) measurement of the evaluation cell of Example 2 was carried out.

Potential sweeping was carried out from the open circuit potential (OCP) to the noble potential side (anode side) of the working electrode, until the potential of the working electrode reached 1.2 V vs. Hg/HgO. Then, the sweep direction of the potential sweeping was reversed to the base potential side (cathode side), and the potential sweeping was carried out until the potential of the working electrode reached the OCP. A combination of the sweeping from the OCP to 1.2 V vs. Hg/HgO and the sweeping from 1.2 V vs. Hg/HgO to the OCP was determined as one cycle. The OCP of the working electrode to which the natural graphite (A) was applied, was about –0.7 V vs. Hg/HgO.

CV measurement was carried out at the following sweep rates and cycle numbers, in the following order: 2 cycles at 1000 mV/s, 2 cycles at 500 mV/s, 2 cycles at 250 mV/s, 2 cycles at 100 mV/s, 2 cycles at 50 mV/s, 2 cycles at 25 mV/s, 2 cycles at 10 mV/s, and 2 cycles at 5 mV/s. Of cyclic voltammograms thus obtained, the cyclic voltammogram of the first cycle when two cycles were carried out at 10 mV/s, at which it is easiest to confirm and compare oxidation and reduction peaks derived from the main reaction, was used for observation.

Figure 3:
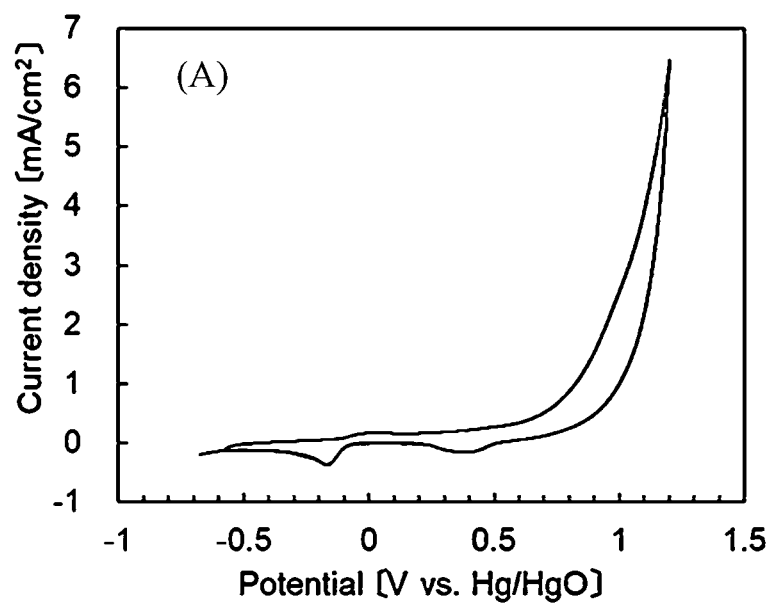
FIG. 3 is a cyclic voltammogram of the first cycle of two cycles carried out at 10 mV/s on the evaluation cell of Example 2, the cell comprising an electrode to which a spherical natural graphite (A) powder having a D50 of 14 μm was applied as the graphite.

FIG. 3 shows a cyclic voltammogram of the first cycle of two cycles carried out at 10 mV/s on the evaluation cell of Example 2, the cell comprising an electrode to which a spherical natural graphite (A) powder having a D50 of 14 µm was applied as the graphite.

CV measurement of the evaluation cells of Example 4, Example 5 and Comparative Example 1 was carried out in the same manner as the evaluation cell of Example 2.

Figure 4:
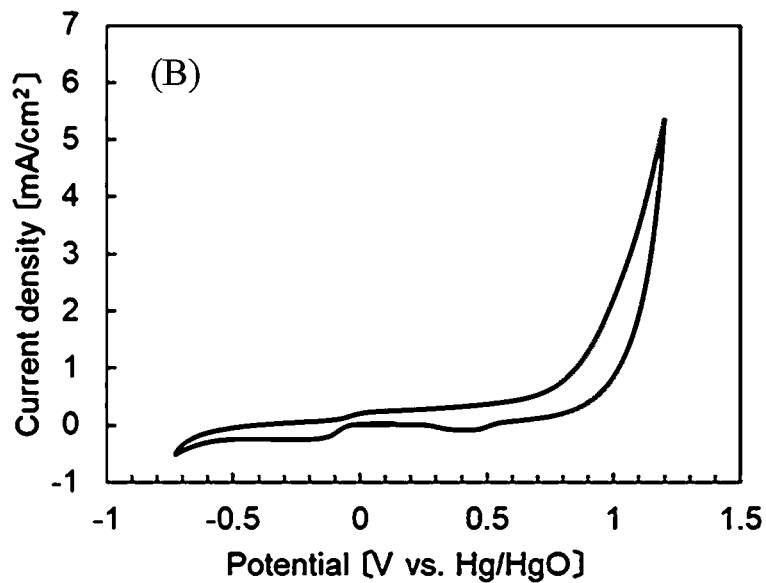
FIG. 4 is a cyclic voltammogram of the first cycle of two cycles carried out at 10 mV/s on the evaluation cell of Example 4, the cell comprising an electrode to which a flaky natural graphite (B) powder having a D50 of 17 μm was applied as the graphite.

FIG. 4 shows a cyclic voltammogram of the first cycle of two cycles carried out at 10 mV/s on the evaluation cell of Example 4, the cell comprising an electrode to which a flaky natural graphite (B) powder having a D50 of 17 µm was applied as the graphite.

Figure 5:
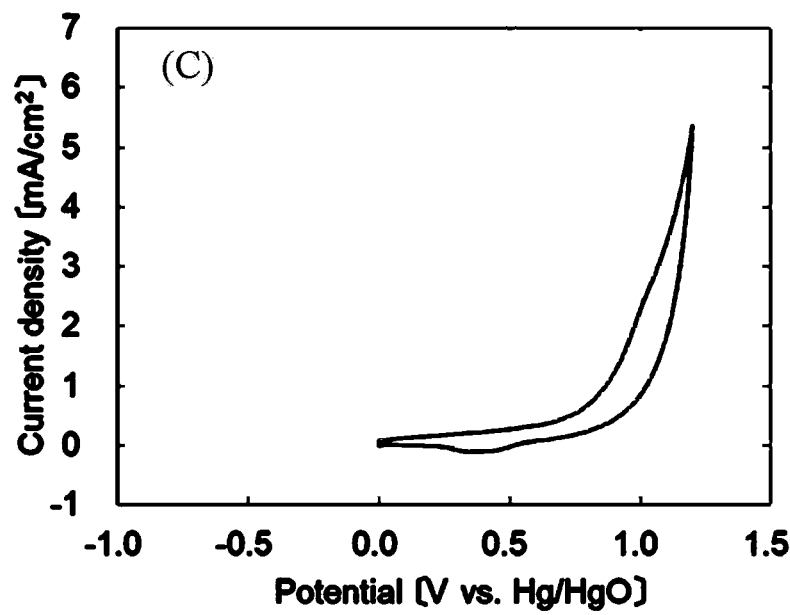
FIG. 5 is a cyclic voltammogram of the first cycle of two cycles carried out at 10 mV/s on the evaluation cell of Example 5, the cell comprising an electrode to which a flaky pyrolytic graphite (C) powder having a D50 of 30 μm was applied as the graphite.

FIG. 5 shows a cyclic voltammogram of the first cycle of two cycles carried out at 10 mV/s on the evaluation cell of Example 5, the cell comprising an electrode to which a flaky pyrolytic graphite (C) powder having a D50 of 30 µm was applied as the graphite.

Figure 6:
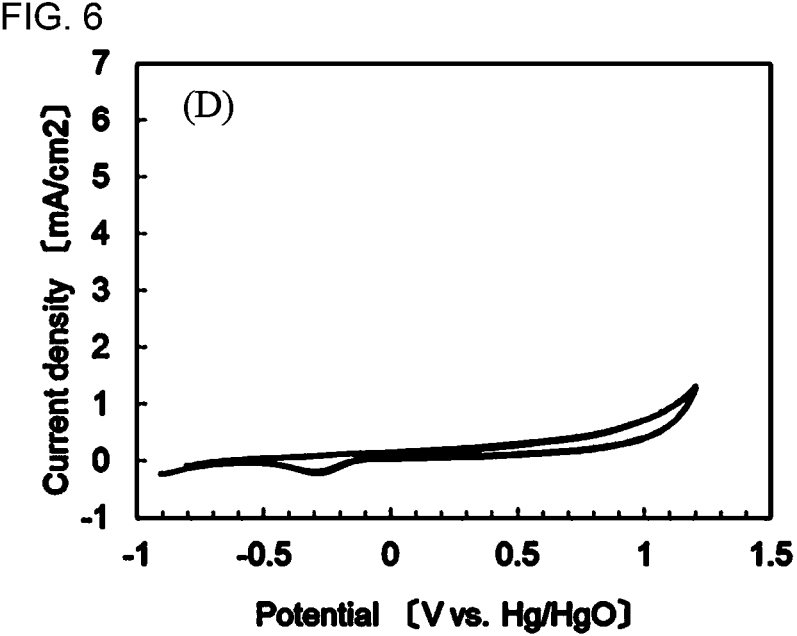
FIG. 6 is a cyclic voltammogram of the first cycle of two cycles carried out at 10 mV/s on the evaluation cell of Comparative Example 1, the cell comprising an electrode to which a randomly-formed artificial graphite (D) powder having a D50 of 5 μm was applied as the graphite.

FIG. 6 shows a cyclic voltammogram of the first cycle of two cycles carried out at 10 mV/s on the evaluation cell of Comparative Example 1, the cell comprising an electrode to which a randomly-formed artificial graphite (D) powder having a D50 of 5 µm was applied as the graphite.

The reduction-side current peak around 0.4 V vs. Hg/HgO is thought to correspond to the extraction reaction of the OH$^-$ inserted between the graphite layers. In FIGS. 3 to 5, the reduction-side current peak was confirmed around 0.4 V vs. Hg/HgO. Accordingly, the graphites used in Examples 2, 4 and 5 were confirmed to have activity to the OH$^-$ insertion and extraction reactions.

As shown in FIG. 6, for the artificial graphite, the reduction-side current peak was not confirmed around 0.4 V vs. Hg/HgO. It is presumed that this is because the crystallinity of the artificial graphite used was low. For the graphite with low crystallinity, it is thought that since the reactivity to OH$^-$ extraction and insertion is low, the reduction current derived from the OH$^-$ extraction reaction was not confirmed. For the graphite with high crystallinity, it is thought that since the reactivity to OH$^-$ extraction and insertion is high compared to the graphite with low crystallinity, the reduction current derived from the OH$^-$ extraction reaction was confirmed.

[Evaluation of the Evaluation Cells using the Electrodes to which the Spherical Natural Graphites were Applied]

Using the potentiostat ("VMP3" manufactured by Bio-Logic), CV measurement of the evaluation cells of Examples 1 to 3, in which the spherical natural graphites different in D50 were used, was carried out in the following condition.

Potential sweeping was carried out from the open circuit potential (OCP) to the noble potential side (anode side) of the working electrode, until the potential of the working electrode reached 1.2 V vs. Hg/HgO. Then, the sweep direction of the potential sweeping was reversed to the base potential side (cathode side), and the potential sweeping was carried out until the potential of the working electrode reached the OCP. A combination of the sweeping from the OCP to 1.2 V vs. Hg/HgO and the sweeping from 1.2 V vs. Hg/HgO to the OCP was determined as one cycle.

The sweep rate was 10 mV/s, and the cycle number was 10 cycles.

Figure 7:
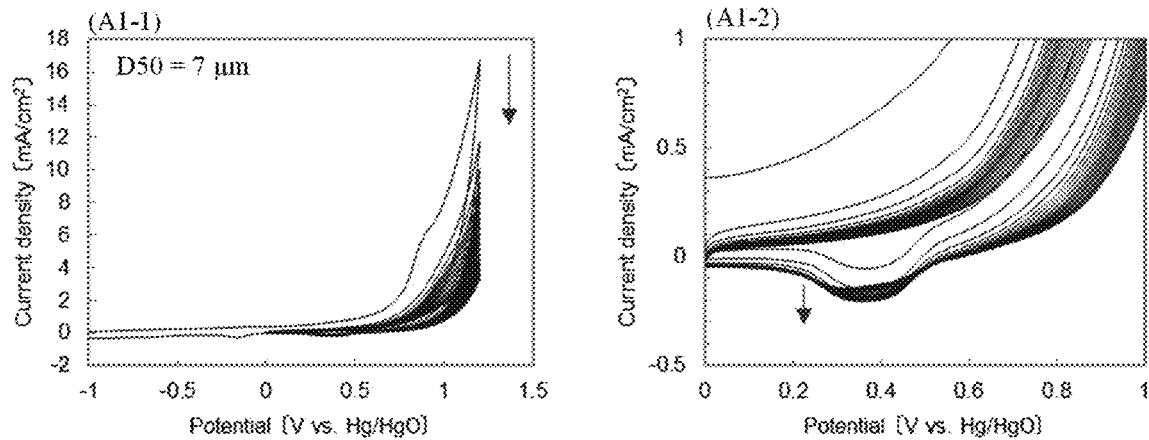
FIG. 7 shows cyclic voltammograms (A1-1) and (A1-2) obtained by carrying out 10 CV cycles on the evaluation cell of Example 1, the cell comprising an electrode to which a spherical natural graphite (A) powder having a D50 of 7 μm was applied, the (A1-1) being an overview, and the (A1-2) being an enlarged image of a reduction peak around 0.4 V vs. Hg/HgO.

FIG. 7 shows cyclic voltammograms (A1-1) and (A1-2) obtained by carrying out 10 CV cycles on the evaluation cell of Example 1, the cell comprising an electrode to which a spherical natural graphite (A) powder having a D50 of 7 μm was applied, the (A1-1) being an overview, and the (A1-2) being an enlarged image of a reduction peak around 0.4 V vs. Hg/HgO.

Figure 8:
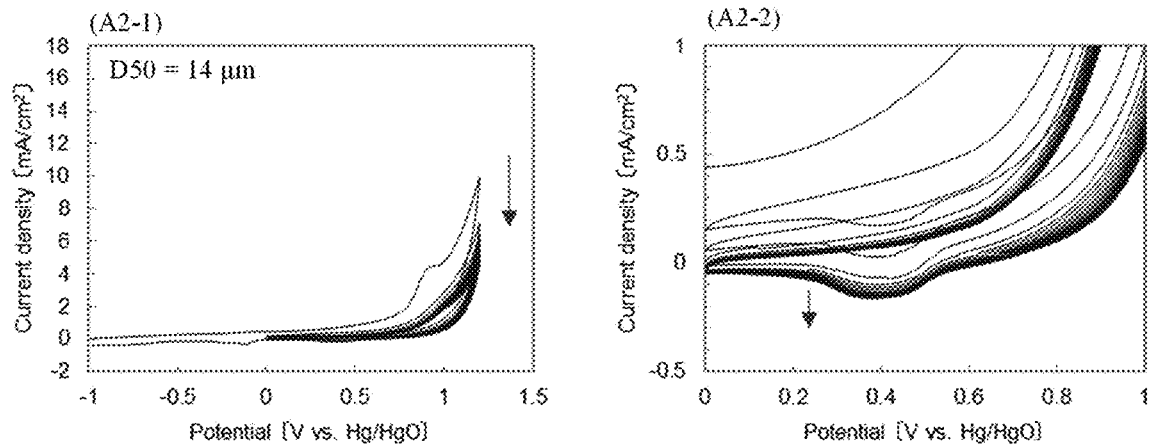
FIG. 8 shows cyclic voltammograms (A2-1) and (A2-2) obtained by carrying out 10 CV cycles on the evaluation cell of Example 2, the cell comprising the electrode to which the spherical natural graphite (A) powder having a D50 of 14 μm was applied, the (A2-1) being an overview, and the (A2-2) being an enlarged image of a reduction peak around 0.4 V vs. Hg/HgO.

FIG. 8 shows cyclic voltammograms (A2-1) and (A2-2) obtained by carrying out 10 CV cycles on the evaluation cell of Example 2, the cell comprising the electrode to which the spherical natural graphite (A) powder having a D50 of 14 μm was applied, the (A2-1) being an overview, and the (A2-2) being an enlarged image of a reduction peak around 0.4 V vs. Hg/HgO.

Figure 9:
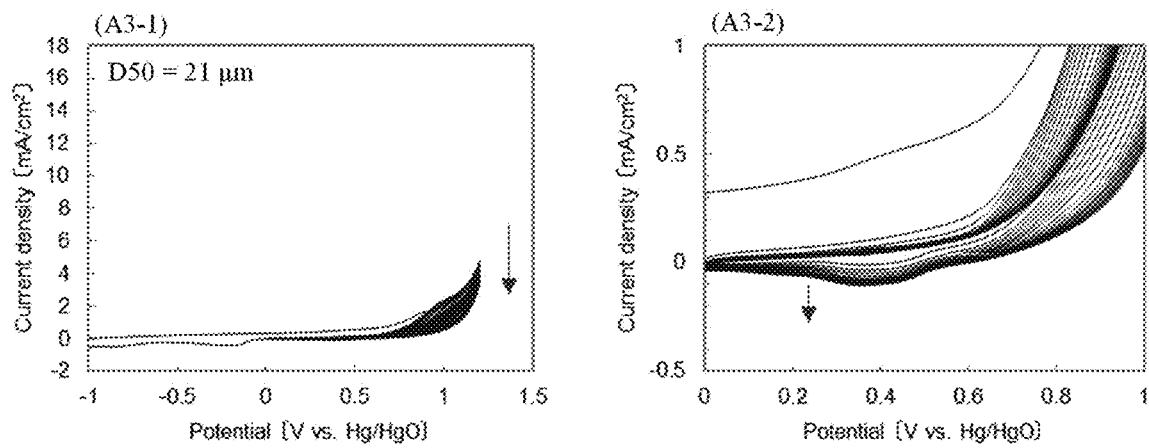
FIG. 9 shows cyclic voltammograms (A3-1) and (A3-2) obtained by carrying out 10 CV cycles on the evaluation cell of Example 3, the cell comprising an electrode to which a spherical natural graphite (A) powder having a D50 of 21 μm was applied, the (A3-1) being an overview, and the (A3-2) being an enlarged image of a reduction peak around 0.4 V vs. Hg/HgO.

FIG. 9 shows cyclic voltammograms (A3-1) and (A3-2) obtained by carrying out 10 CV cycles on the evaluation cell of Example 3, the cell comprising an electrode to which a spherical natural graphite (A) powder having a D50 of 21 μm was applied, the (A3-1) being an overview, and the (A3-2) being an enlarged image of a reduction peak around 0.4 V vs. Hg/HgO.

In FIGS. 7 to 9, the reduction-side current peak was confirmed around 0.4 V vs. Hg/HgO. Accordingly, the natural graphites used in Examples 1 to 3, which were different in D50, were confirmed to have activity to the OH$^-$ insertion and extraction reactions.

[XRD Measurement of the Graphites]

Using "ULTIMA IV" (manufactured by Rigaku Corporation), XRD measurement of the spherical natural graphite (A) with CuKα radiation was carried out to obtain an XRD spectrum. From the XRD spectrum thus obtained, the crystal structure of the natural graphite (A) was analyzed.

The crystal structures of the flaky natural graphite (B), the pyrolytic graphite (C) and the artificial graphite (D) were analyzed in the same manner as the spherical natural graphite (A).

Figure 10:
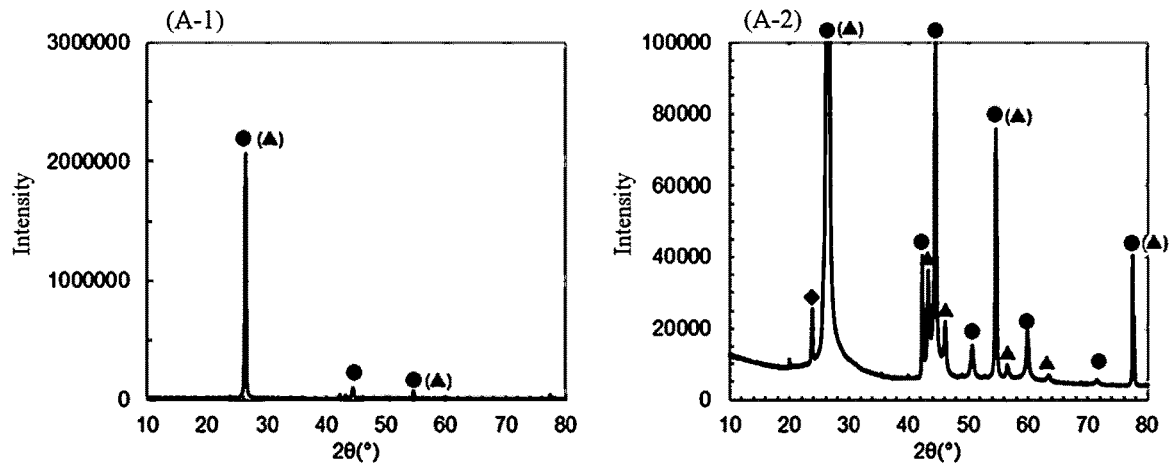
FIG. 10 shows XRD spectra (A-1) and (A-2) of the spherical natural graphite (A), the (A-1) being an overview, and the (A-2) being an enlarged image of the low intensity range.

FIG. 10 shows XRD spectra (A-1) and (A-2) of the spherical natural graphite (A), the (A-1) being an overview and the (A-2) being an enlarged image of the low intensity range.

Figure 11:
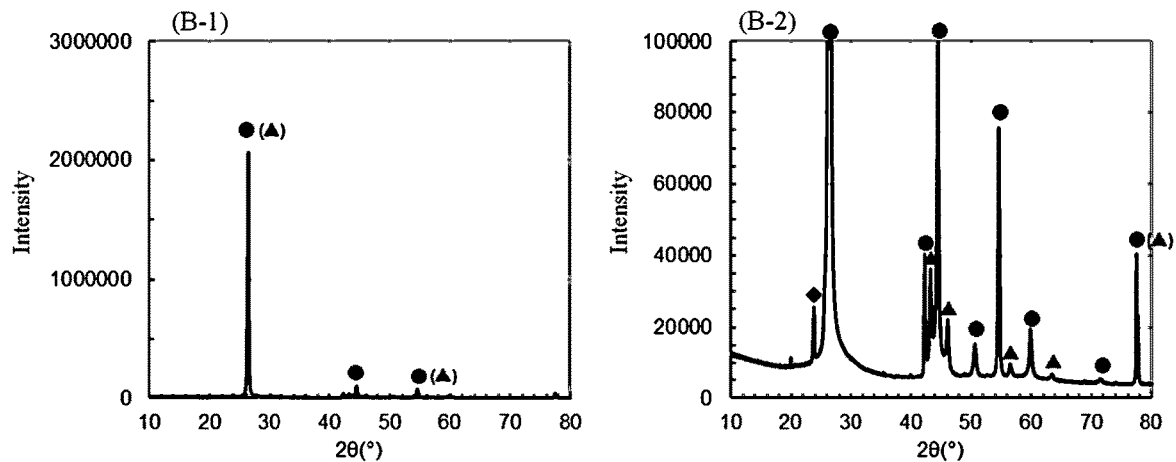
FIG. 11 shows XRD spectra (B-1) and (B-2) of the flaky natural graphite (B), the (B-1) being an overview, and the (B-2) being an enlarged image of the low intensity range.

FIG. 11 shows XRD spectra (B-1) and (B-2) of the flaky natural graphite (B), the (B-1) being an overview, and the (B-2) being an enlarged image of the low intensity range.

Figure 12:
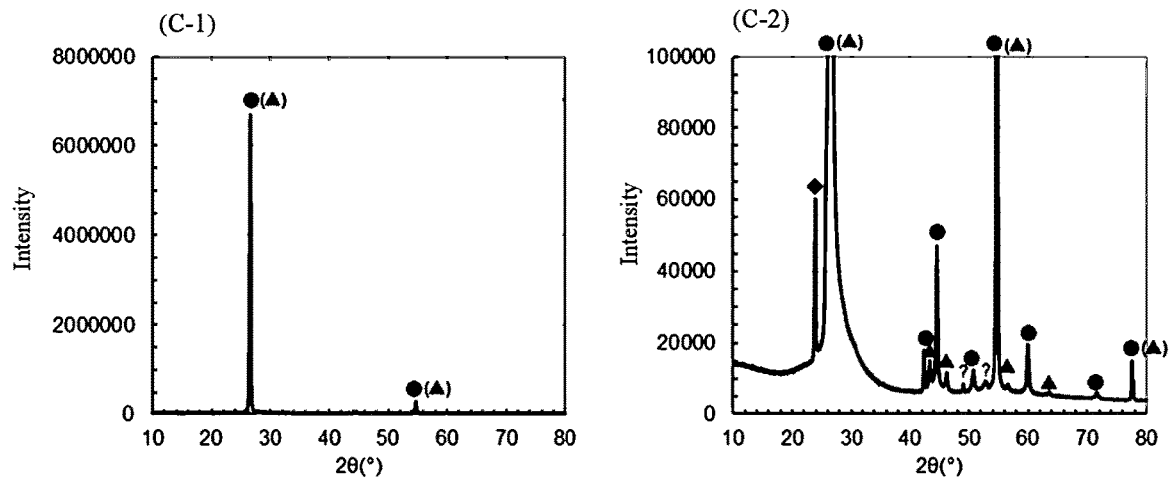
FIG. 12 shows XRD spectra (C-1) and (C-2) of the pyrolytic graphite (C), the (C-1) being an overview, and the (C-2) being an enlarged image of the low intensity range.

FIG. 12 shows XRD spectra (C-1) and (C-2) of the pyrolytic graphite (C), the (C-1) being an overview, and the (C-2) being an enlarged image of the low intensity range.

Figure 13:
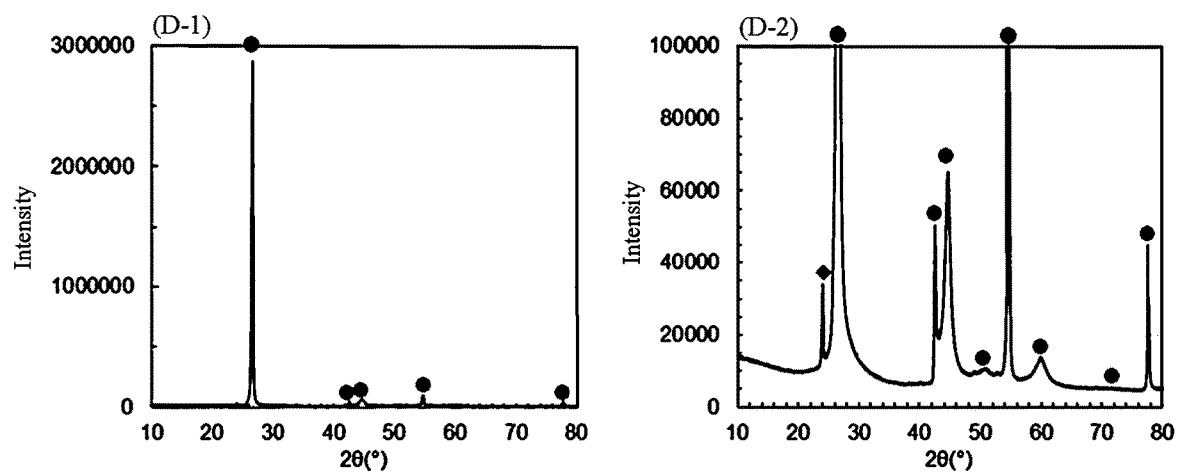
FIG. 13 shows XRD spectra (D-1) and (D-2) of the artificial graphite (D), the (D-1) being an overview, and the (D-2) being an enlarged image of the low intensity range.

FIG. 13 shows XRD spectra (D-1) and (D-2) of the artificial graphite (D), the (D-1) being an overview, and the (D-2) being an enlarged image of the low intensity range.

As shown in FIGS. 10 to 12, these graphites have peaks at diffraction angles 2θ of 26°±0.5°, 44°±0.5°, 46°±0.5°, 55°±0.5°, 57°±0.5°, 64°±0.5°, 78°±0.5°. Accordingly, the graphites were confirmed to have the rhombohedral crystal structure. In FIG. 13, at least one of the above peaks was not confirmed. Accordingly, the artificial graphite (D) used here was confirmed not to have the rhombohedral crystal structure.

From the above results, it was revealed that as shown in FIGS. 3 to 6 and 10 to 13, the graphite having activity to the OH$^-$ insertion and extraction reactions, has the rhombohedral crystal structure. That is, the graphite having the rhombohedral crystal structure is thought to have activity to the OH$^-$ insertion and extraction reactions. Accordingly, even the artificial graphite is presumed to have activity to the OH$^-$ insertion and extraction reactions, as long as it has the rhombohedral crystal structure.

[Charge-Discharge Efficiency Calculation]

Using the potentiostat ("VMP3" manufactured by Bio-Logic), CV measurement of the evaluation cells of Examples 1 to 5 and Comparative Examples 1 to 3 was carried out in the following condition.

Potential sweeping was carried out by sweeping the potential of the working electrode from 0 V vs. Hg/HgO to the noble potential side (anode side) until the potential of the working electrode reached 1.2 V vs. Hg/HgO. Then, the sweep direction of the potential sweeping was reversed to the base potential side (cathode side), and the potential sweeping was carried out until the potential of the working electrode reached 0 V vs. Hg/HgO. A combination of the sweeping from 0 V vs. Hg/HgO to 1.2 V vs. Hg/HgO and the sweeping from 1.2 V vs. Hg/HgO to 0 V vs. Hg/HgO is determined as one cycle.

The sweep rate was 10 mV/s, and the cycle number was one cycle.

From the cyclic voltammogram obtained by the CV measurement, the charge amount (mC/g) of the reduction-side current peak and the charge amount (mC/g) of the oxidation-side faradaic current were calculated.

The charge-discharge efficiency was calculated by the following formula. The result is shown in Table 1.

Charge-discharge efficiency (%)
=(Charge amount of the reduction-side current peak/ Charge amount of the oxidation-side faradaic current)×100

TABLE 1

| | Type of graphite | Graphite form | D50 (μm) | BET specific surface area (m$^2$/g) | Rhombohedral crystal | Charge amount (mC/g) | | Charge-discharge efficiency |
| | | | | | | Reduction-side charge amount | Oxidation-side charge amount | |
|---|---|---|---|---|---|---|---|---|
| Example 1 | Natural graphite | Spherical | 7 | 9.6 | Present | 1211 | 102055 | 1.2% |
| Example 2 | Natural graphite | Spherical | 14 | 5.7 | Present | 1171 | 65395 | 1.8% |
| Example 3 | Natural graphite | Spherical | 21 | 3.9 | Present | 391 | 63784 | 0.6% |
| Example 4 | Natural graphite | Flaky | 17 | No data | Present | 1523 | 96761 | 1.6% |
| Example 5 | Pyrolytic graphite | Flaky | 30 | No data | Present | 1416 | 84433 | 1.7% |

TABLE 1-continued

|  | Type of graphite | Graphite form | D50 (μm) | BET specific surface area (m²/g) | Rhombohedral crystal | Charge amount (mC/g) | | |
| --- | --- | --- | --- | --- | --- | --- | --- | --- |
|  |  |  |  |  |  | Reduction-side charge amount | Oxidation-side charge amount | Charge-discharge efficiency |
| Comparative Example 1 | Artificial graphite | Random | 5 | 2.9 | Not present | 0 | 29184 | 0.0% |
| Comparative Example 2 | Hard carbon | Rectangular | No data | No data | Not present | 0 | 211968 | 0.0% |
| Comparative Example 3 | Carbon nanotube | — | No data | No data | Not present | 0 | 137275 | 0.0% |

The evaluation batteries of Examples 1 to 5 using the electrodes to which the powders of the graphites having the rhombohedral crystal structure were applied, had a charge-discharge efficiency of 0.6% or more, and they were confirmed to be chargeable/dischargeable. For these batteries, since the charge amount of the oxygen evolution, which is a side reaction, included in the charge amount of the oxidation-side faradaic current, is large, the charge-discharge efficiency is 1.8% or less and small. However, since the charge-discharge efficiency is not 0%, it is proved that OH⁻ is inserted in the graphite even while oxygen is evolved. Accordingly, the aqueous battery in which the graphite having the rhombohedral crystal structure was used as the cathode active material, was proved to be chargeable/dischargeable.

The charge amounts of the oxidation-side faradaic currents of the evaluation batteries of Examples 1 to 3 were compared, the batteries using the electrodes to which the spherical natural graphite powders different in D50 were applied. As the D50 decreases, the charge amount of the oxidation-side faradaic current increases. As a result, it was revealed that as the D50 decreases, not only the target OH⁻ extraction and insertion reactions but also the oxygen evolution reaction, which is a side reaction, are activated. For the oxidation-side reaction, not only the target OH⁻ extraction and insertion reactions but also the oxygen evolution reaction arising from the oxidative decomposition of water, which is a side reaction, proceed, and the reaction amount of the side reaction is larger. However, when the D50 is in a range of 14 μm or less, compared to the case where the D50 is more than 14 μm, the charge-discharge efficiency increases. This is presumed to be due to the influence of an increase in, due to a decrease in the D50, the proportion of the defects of the graphene structure (such as an edge that is especially active to the oxygen evolution reaction) in the crystal structure of the graphite.

For the evaluation battery of Example 4 using the electrode to which the flaky natural graphite (B) powder was applied, and for the evaluation battery of Example 5 using the electrode to which the flaky pyrolytic graphite (C) powder was applied, it was revealed that as long as the D50 is in a range of from 17 μm to 30 μm, the charge-discharge efficiency is high compared to the evaluation battery of Example 3 using the electrode to which the spherical natural graphite (A) powder was applied. The reason is presumed as follows: since the graphite is in the flaky form, compared to the case where the graphite is spherical, the proportion of the defects of the graphene structure (such as the edge that is especially active to the oxygen evolution reaction) is large.

Example 6

[Aqueous Battery Production]

A spherical natural graphite (A) powder having a D50 of 14 μm (BET specific surface area 5.7 m²/g) was prepared as a graphite. As a binder, PVDF (#9305 manufactured by Kureha Corporation) was prepared. The graphite and the PVDF were mixed at a mass ratio of 95:5. A mixture thus obtained was formed into a paste, using N-methylpyrrolidone (NMP) (manufactured by Kishida Chemical Co., Ltd.) as a solvent. The paste was applied on a Ti current collecting foil (manufactured by Rikazai Co., Ltd., thickness 15 μm) that the overvoltage of the oxygen evolution reaction was large, thereby obtaining an electrode. The electrode was used as a cathode.

A KOH aqueous solution (concentration 6 mol/L) saturated with ZnO was used as an aqueous liquid electrolyte.

A non-woven fabric was used as a separator.

A zinc foil (manufactured by Nilaco Corporation, thickness 50 μm) was used as an anode.

A mercury/mercuric oxide (Hg/HgO) electrode (manufactured by International Chemistry Co., Ltd.) was used as a reference electrode.

A SB8 cell (manufactured by EC Frontier Co., Ltd.) was used as a resin two-electrode cell for battery evaluation.

The resin two-electrode cell was combined with the cathode and the anode. The aqueous liquid electrolyte was injected into the resin two-electrode cell, thereby producing the aqueous battery of Example 6.

[Charge-Discharge Evaluation for the Aqueous Battery]

The potentiostat ("VMP3" manufactured by BioLogic) was used for evaluation. The battery was charged by applying a current of 1500 μA/g-graphite for 5 hours and discharged by applying a current of 3 μA/g-graphite until the voltage reached 1.4 V. The charge and discharge were determined as one cycle, and a total of 10 cycles were carried out.

Figure 14:
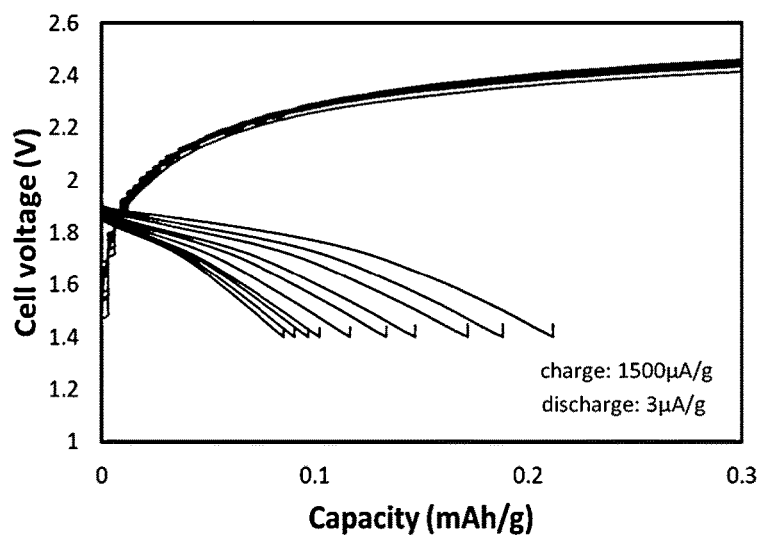
FIG. 14 shows a charge-discharge curve for an aqueous battery comprising a cathode to which the spherical natural graphite (A) powder having a D50 of 14 μm was applied.

FIG. 14 shows a charge-discharge curve for an aqueous battery comprising a cathode to which the spherical natural graphite (A) powder having a D50 of 14 μm was applied.

As shown in FIG. 14, for the aqueous battery comprising the natural graphite as the cathode and the zinc foil as the anode, the charge-discharge behavior exhibiting a battery voltage of 2 V or more, was observed.

In a strong alkaline aqueous solution such as KOH, the reaction potential of Zn is about −1.6 V vs. SHE. The reaction potential of Cd, Fe and common hydrogen storage alloys is about −0.9 V vs. SHE. Accordingly, the battery voltage of the aqueous battery using the Zn-based anode, has an advantage of about 0.7 V over the aqueous batteries using the Cd-based, Fe-based and hydrogen storage alloy anodes.

REFERENCE SIGNS LIST

11. Aqueous liquid electrolyte
12. Cathode layer
13. Anode layer
14. Cathode current collector
15. Anode current collector
16. Cathode
17. Anode
100. Aqueous battery

The invention claimed is:

1. An aqueous secondary battery comprising a cathode layer, an anode layer and an aqueous liquid electrolyte,
wherein the cathode layer contains, as a cathode active material, a graphite having a rhombohedral crystal structure;
wherein the anode layer contains, as an anode active material, at least one selected from the group consisting of an elemental Zn, an elemental Cd, an elemental Fe, a Zn alloy, a Cd alloy, an Fe alloy, ZnO, $Cd(OH)_2$, $Fe(OH)_2$ and a hydrogen storage alloy; and
wherein, as an electrolyte, at least one selected from the group consisting of KOH and NaOH is dissolved in the aqueous liquid electrolyte.

2. The aqueous secondary battery according to claim 1, wherein a volume-based median diameter (D50) of the graphite is from 7 μm to 30 μm.

3. The aqueous secondary battery according to claim 1, wherein the graphite is a natural graphite or a pyrolytic graphite.

4. The aqueous secondary battery according to claim 1, wherein a BET specific surface area of the graphite is 5.7 $m^2/g$ or more.

5. The aqueous secondary battery according to claim 1, wherein the volume-based median diameter (D50) of the graphite is from 17 μm to 30 μm.

6. The aqueous secondary battery according to claim 1, wherein the aqueous secondary battery is configured to be repeatedly charged and discharged.

7. The aqueous secondary battery according to claim 6, wherein the aqueous secondary battery is a car battery.

* * * * *